United States Patent Office 3,707,592
Patented Dec. 26, 1972

3,707,592
PROCESSES FOR SUSPENSION-POLYMERIZING VINYLIDENE FLUORIDE AND ORIENTING THE MELT EXTRUDED POLYMER
Hajime Ishii, Nobuo Bannai, and Sadao Nishita, Iwaki-shi, Japan, assignors to Kureha Kagaku Kogyo Kabushiki Kaisha
Continuation-in-part of abandoned application Ser. No. 501,888, Oct. 22, 1965. This application Jan. 15, 1970, Ser. No. 3,204
Int. Cl. C08f 3/22; D01d 5/12
U.S. Cl. 264—210 R           2 Claims

ABSTRACT OF THE DISCLOSURE

Vinylidene fluoride polymers having a crystallization temperature above 135° C. and a melting temperature above 175° C. Articles such as fibers, films, etc., made from such polymers, have excellent heat-resistant properties and high mechanical strength. The aforementioned polymers may be produced by suspension polymerizing polyvinylidene fluoride in a water medium at a temperature preferably between 0° C. and 30° C. in the presence of a catalyst which may be a dialkyl peroxy dicarbonate or a dialkyl peroxy carbonate.

REFERENCE TO RELATED APPLICATION

This application is a continuation-in-part of our co-pending application Ser. No. 501,888 filed Oct. 22, 1965 for "Polyvinylidene Fluoride Resins and Formed Articles Thereof and Processes Therefor," and now abandoned.

BACKGROUND OF THE INVENTION

This invention relates to improvements in the manufacture of polyvinylidene fluoride resins and formed articles of exceptionally high mechanical strength and resistance to heat and in the fabrication of polyvinylidene fluoride resinous materials through the melt extrusion process.

More particularly it relates to processes which include continuously extruding molten materials comprising linear polyvinylidene fluoride through an orifice, polyvinylidene fluoride resins capable of being obtained by polymerization at a relatively low temperature, and to improve mouldings having an excellent processability and heat resistivity.

SUMMARY OF THE INVENTION

The first object of this invention is to provide polyvinylidene fluoride mouldings having heat-resistivity extremely higher than the conventional polyvinylidene fluoride, high mechanical strength at a high temperature, and excellent dimensional stability.

The second object of this invention is to provide polyvinylidene fluoride mouldings of exceptionally high resistance to heat, the melting temperatures of which are higher than 175° C. and the crystallization temperatures of which are higher than 135° C.

The third object is to provide preferential polyvinylidene fluoride resinous materials for melt extrusions, which can be easily extruded with exceptionally low melt viscosities, and the inherent viscosity (to be defined hereinafter) which is below 1.20 and above 0.40.

The fourth object is to provide polyvinylidene fluoride mouldings through melt extrusion and injection without or with any plasticizers (less than 5%) which are more resistant to heat than well-known commercial polyvinylidene fluoride mouldings and have good mechanical properties.

The fifth object is to provide improvements in manufacturing polyvinylidene fluoride fibre or film, the tensile strength of which is substantially high. These improvements include processes which comprise continuously extruding the molten materials consisting of linear polyvinylidene fluoride without a plasticizer through a spinneret or a slot orifice, stretches and anneals.

A more specific object is to provide a method for producing low denier, high tenacity, textile and industrial filaments or thin and tough films from the molten linear polyvinylidene fluoride with a minimum of melt-extruding apparatus.

These and other objects will become more clearly apparent hereinafter, and the nature of the present invention will be described in the following with respect to principles and typical examples of the procedure and results.

DETAILED DESCRIPTION OF THE INVENTION

Figure 1A:
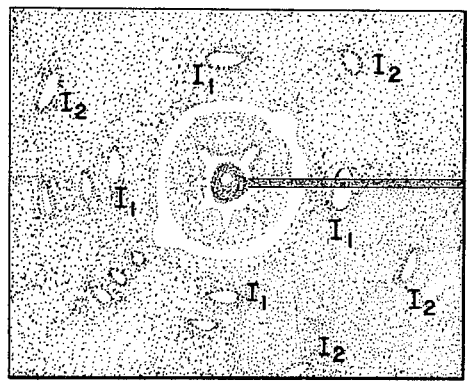
FIGS. 1(a), 1(b), and 1(c) are, respectively, X-ray diffraction pattern photographs (in the case where the value of $I_1/I_2$ is greater than 1.3) of a polyvinylidene fibrous formed article having, principally, an α type crystalline structure, X-ray diffraction pattern photograph (in the case where $I_1/I_2$ is about 1.3) of a polyvinylidene fibrous formed article having a crystalline structure at least one part of which has been transformed to β type crystalline structure, and X-ray diffraction pattern photograph (in the case where $I_1/I_2$ is about 0.0) of a polyvinylidene fibrous formed article having, almost completely, β type crystalline structure.
Figure 1B:
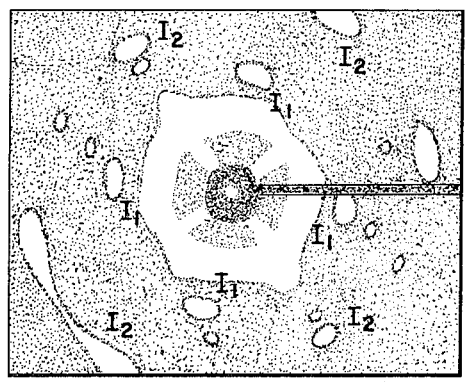
Figure 1C:
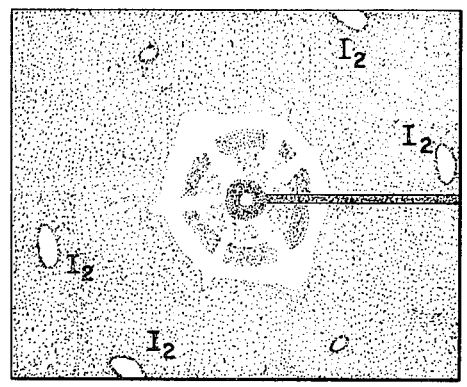

Applicants have found that the polyvinylidene fluoride of the present invention has a melting temperature of above at least about 175° C. and a crystallization temperature of about 140° C., which were both comparatively higher than that of the known polyvinylidene fluoride prepared at a higher temperature, when vinylidene fluoride monomer was polymerized at 0° C. to 60° C., particularly 40° C., by some peroxide catalysts such as dipropylperoxydicarbonates. Therefore, the resistance to heat of the polyvinylidene fluoride mouldings of this invention, provided through the processes such as melt-extrusion and injection, has been at least 10° C. higher than that of the well known polyvinylidene fluoride mouldings.

Furthermore, we have found that, in the case of said polymerization, the polyvinylidene fluoride the polymerization degree of which has been adjusted so that inherent viscosity of the polymer becomes 0.4–1.2 has, although crystallization temperature and melting point of said polymer are relatively high, such a very low melt viscosity at a processing temperature and such an excellent processability as enabling very easy production of an excellent formed article having high heat-resistivity and mechanical properties.

For example, in the case of a polyvinylidene fluoride obtained by polymerizing vinylidenefluoride at a temperature between 20° C. and 30° C. in the presence of a chain transfer agent and diisopropylperoxydicarbonate catalyst and an inherent viscosity of 0.94, melting point and crystallization temperature were higher, by about 15° C., than those of the conventional known polyvinylidene fluoride, but apparent viscosity in the case of extrusion at a temperature of 250° C. and a pressure of 100 kg./cm.² was 9,000 poise. Furthermore, melt of said polymer resin had an excellent drawability. Heat-deformation temperature of the article formed from the above-mentioned resin was 164° C. (or 120° C.) at 66 p.s.i. (or 264 p.s.i.) according to ASTM–D648, said temperatures being higher (by about 15° C.–30° C.), respectively, than those of the conventional known polyvinylidene fluoride.

Of course, there is a clear relationship between the inherent viscosity and melt viscosity of any polymer. In general, when the inherent viscosity decreases, the melt temperature decreases, but crystallizability of the polymer becomes high, whereby it is presumed that melt viscosity increases with increase in the crystallization temperature.

It is surprising that melt viscosity of the polyvinylidene fluoride obtained by low temperature polymerization is very low in spite of the fact that melting temperature and crystallization temperature of said fluoride is higher such as by about 15° C.

Since there is an intimate relationship between the inherent viscosity and polymerization degree of the polymer, when said viscosity is decreased, the mechanical properties of the polymer become inferior. However, mechanical strength of the formed article produced by use of a vinylidene fluoride having an inherent viscosity of 0.94 is not inferior or more excellent than that of the conventional known polyvinylidene fluoride. This point is a characteristic feature of the instant polyvinylidene fluoride prepared by suspension-polymerization at such low temperature.

The formed article made of polyvinylidene fluoride of this invention is obtained by suspension polymerizing vinylidenefluoride at a temperature between $-10°$ C. and 60° C., preferably between 0° C. and 40° C. so as to obtain polyvinylidene fluoride having a melting point about 180–190° C., and subjecting said product to extrusion with or without addition of a plasticizer (5% by weight).

A feature of the polymerization applied in this invention may be represented as follows:

The polymerization catalyst having a half life time of less than one hundred hours at 50° C. has been preferred especially for the polymerization of vinylidene fluoride such as that by the suspension technique. It has been desired that these catalysts do not immediately terminate the polymerization reaction during the initial period. The hydrogen atom of the catalysts may be easily extracted by the environmental vinylidene fluoride radical, because the vinylidene fluoride radical has a strong affinity to the hydrogen atoms and the extracted hydrogen atoms become the polymerization stoppers or the chain transfer agents.

Therefore, it may be said that the applicable catalysts are enumerted as follows:

$$R-O-\overset{O}{\underset{\|}{C}}-O-O-\overset{O}{\underset{\|}{C}}-O-R$$

where R is a primary alkyl group of C=1–4 or a secondary alkyl group of C=3–6, or $$R-O-\overset{O}{\underset{\|}{C}}-O-O-R'$$

where R is a primary alkyl group of C=1–3, a secondary alkyl group of C=3–5, and/or a tertiary alkyl group of C=4–6, and R' is a primary alkyl group of C=1–3 or a secondary alkyl group of C=3–5.

Of the dialkylperoxydicarbonates, there may be mentioned such compounds as diisopropylperoxydicarbonate,
disecondarybutylperoxydicarbonate,
di-secondaryamylperoxydicarbonate,
disecondaryhexylperoxydicarbonate,
diethylperoxydicarbonate,
di-n-propylperoxydicarbonate, and
di-n-butylperoxydicarbonate.

In respect to the dialkylperoxycarbonates, there may be mentioned such compounds as wherein the R groups are methyl, ethyl, n-propyl, isopropyl, secondarybutyl, 2-methyl butyl, tertiary butyl, tertiary amyl and 2,2-dimethyl-butyl, and wherein the R' groups are methyl, ethyl, n-propyl, isopropyl, secondarybutyl and secondary amyl.

However, in these catalysts also, a hydrogen extracting action caused by vinylidene fluoride-radical is achieved, so that the catalysts themselves function as polymerization degree controlling agents and the inherent viscosity of the polymer can be easily controlled by controlling the quantities of the catalysts and polymerization temperatures.

On the other hand, since it is usual to use an expensive catalyst as the polymerization degree controlling agent and use of a large quantity of said catalyst causes reduction of the heat-stability of the produced polymer, it is preferable to control the polymerization degree by using a chain transfer agent. As such chain transfer agents, for example, well-known chain transfer agents such as chloroform, carbon tetrachloride, trichlorethane, n-hexane, cyclohexane, etc. can be used.

Among said radical catalysts, the catalyst having a short period of half decay, containing hard transferable hydrogen in its alkyl-radical, and capable of being handled in a relatively safe manner is mostly preferable. As these catalysts, there are diisopropyl peroxydicarbonate and ditertiary butylperoxydicarbonate, but the diisopropyl peroxydicarbonate is the most excellent one.

The polyvinylidene fluoride resinous materials polymerized at 0° C. to 60° C., especially at 40° C., by using the abovementioned agents, are crystallizable, the melting temperatures of which were higher than 175° C. and the crystallizing temperatures of which were higher than 135° C. Furthermore, the resistance to heat of the abovementioned polyvinylidene fluoride is improved markedly.

Furthermore, the polyvinylidene fluorides resinous materials having easy processability with especially low melt viscosity through processes such as melt extrusion and injection, have been obtained by the abovementioned polymerization, where the degree of polymerization of the polyvinylidene fluoride was eliminated—that is to say—the inherent viscosity was eliminated to 1.20 from 0.40. Further features of the present invention are mentioned with respect to the following examples.

PREFERRED EXAMPLES OF INVENTION

Example 1

Suitable polyvinylidene fluoride powders for the purpose of this invention may be made by suspension of polymerization techniques using the following recipe:

|  | G. |
|---|---|
| Vinylidene fluoride | 1200 |
| Methylcellulose | 3.6 |
| Water | 3600 |

The reaction is carried out with stirring at a rate of 300–350 r.p.m. under the conditions of variable amounts of isopropylperoxydicarbonate and chloroform added. The various polymerization conditions are shown in Table 1.

The expression "inherent viscosity" denoted by the symbol $\eta_{inh}$ is used as a measure of the degree of polymerization of the polyvinylidene fluoride and may be defined as:

$$\eta_{inh} = \frac{\ln \eta_r}{C}$$

(Where $\eta_r$ is the relative viscosity of a dilute dimethylformamide solution of the polyvinylidene fluoride divided by the viscosity of the dimethylformamide per se measured in the same unit at the same temperature (30° C.), and C is the concentration in grams of the polyvinylidene fluoride per 100 cc. of solution (0.4 g. in this invention).)

TABLE I.—POLYMERIZATION OF VINYLIDENE FLUORIDE

| Name | Polymerization temperature (° C.) | Diisopropyl-peroxydi-carbonate [1] (percent) | Chloroform [1] (percent) | Reaction time (hr.) | Conversion (weight percent) | Inherent viscosity of polymer ($\eta_{inh}$) |
|---|---|---|---|---|---|---|
| A | 20-30 | 1 | 1.2 | 40 | 92 | 0.82 |
| B | 20-30 | 1 | 1.0 | 40 | 93 | 0.94 |
| C | 20-30 | 1 | 0.9 | 40 | 95 | 1.06 |
| D | 40-50 | 0.5 | 0 | 25 | 58 | 1.33 |

[1] Percentages are by weight with respect to monomer.

Example 2

It has been found that there are clear difference in physical properties between the polyvinylidene fluoride of this invention which is indicated in Table I and the commercial polyvinylidene fluoride. For both polyvinylidene fluoride resinous materials, Table II shows $\eta_{inh}$, melting temperature and crystallization temperature measured by differential thermal analysis, and specific gravity, respectively. As shown in Table II, it has been found that the melting temperatures of the polyvinylidene fluoride of this invention is about 15–20° C. higher than that of the known commercial polyvinylidene fluoride, while $\eta_{inh}$ or the degree of polymerization of the former was comparatively lower than that of the latter. Moreover, the differential thermal analysis curves show that the endo-therms of the polyvinylidene fluorides of this invention are sharper and much more than those of the known commercial polyvinylidene fluorides when measured in the case of rising temperature. The crystallization temperature of the polyvinylidene fluoride of this invention was also about 15–20° C. higher, the exo-therms were sharper and much more than those of the known commercial polyvinylidene fluorides when measured in the case of falling temperature from above their melting temperatures.

TABLE II.—PHYSICAL PROPERTIES OF VARIOUS POLYVINYLIDENE FLUORIDE RESINOUS MATERIALS

| Kind of polyvinylidene fluoride | $\eta_{inh}$ | Melting temperature [1] (peak) (° C.) | Crystallization temperature [2] (peak) (° C.) | Specific gravity |
|---|---|---|---|---|
| This invention: | | | | |
| A | 0.82 | 186 | 141 | 1.76-1.79 |
| B | 0.94 | 187 | 143 | 1.76-1.79 |
| C | 1.06 | 187 | 146 | 1.76 1.79 |
| D | 1.33 | 187 | 140 | 1.76-1.79 |
| Known commercial: | | | | |
| I | 1.40 | 170 | 125 | 1.70-1.77 |
| II | 1.70 | 170 | 125 | 1.70-1.77 |
| III | 1.90 | 170 | 129 | 1.70-1.77 |

[1] Measured with a Shimadzu DT-10 type differential thermal analyzer at a rate of temperature rise of 10° C./min.
[2] Measured with the same apparatus at a rate of temperature fall of 8° C./min.

It is thought that the differences of the melting temperatures and crystallization temperatures suggest some inherent differences of molecular structure comprising

between the polymeric materials of this invention and the known commercial polymeric materials and that the degree of crystallinity of the polyvinylidene fluoride of this invention may be somewhat higher than that of the commercial polyvinylidene fluoride, as shown in Table II, in which the specific gravity of the former was higher than that of the latter.

Example 3

From the above-described Example 2; it may be concluded that the resistance to heat of the polyvinylidene fluoride of this invention is superior to that of the well known polyvinylidene fluorides. The measurements of the deflection temperatures by the ASTM method revealed more clearly the superiority of the polyvinylidene fluoride of this invention, as shown in Table III.

In this table, the specimens of the polyvinylidene fluorides were made from compression mouldings, and the loads used for measuring were 66 p.s.i. and 264 p.s.i.

TABLE III.—THERMAL DEFLECTION TEMPERATURE

| Kinds of polyvinylidene fluoride | Thermal deflection, 66 p.s.i. | Temperature, ° C., 264 p.s.i. |
|---|---|---|
| This invention: | | |
| A | 165 | 120 |
| B | 165 | 120 |
| C | 165 | 120 |
| Known commerical: II | 149 | 92 |

A further feature of the present invention is the provision of preferable polyvinylidene fluoride resinous materials for the purpose of melt extruding. It may be said that the degree of polymerization or $\eta_{inh}$ of the polymeric materials is very important in melt extruding, and it is preferable to select $\eta_{inh}$ as low as possible in order to obtain easy processability, although the decrease in $\eta_{inh}$ lowers to some extent the physical properties of the polymeric material mouldings. Accordingly, the easy processability for the melt extruding the polyvinylidene fluoride of this invention corresponded to $\eta_{inh}$, which is closely related to the apparent melt viscosity.

In this invention, the purpose for providing the preferable polyvinylidene fluoride resinous materials polymerized at 0° C. to 60° C., particularly 40° C., has been essential for the production of fibre or film through a thin orifice as well as for decreasing melt viscosity. For industrial production of low denier filaments, it should be said that the apparent melt viscosity was as low as at least about ten thousand poise, because the higher poise was to viscous to flow forming itself into a filament with the smooth and gloss surface through a fine orifice. Therefore, it has been necessary to eliminate $\eta_{inh}$ of the polyvinylidene fluoride of this invention within 1.20 in order to obtain the apparent melt viscosity below about ten thousand poises. Moreover, we have unexpectedly found that the polyvinylidene fluoride fibre made from the lower inherent viscosity had stronger tensile strength than that of the higher inherent viscosity of which apparent melt viscosity was as high as beyond about ten thousand poise. According to further feature of the present invention, there was a maximum peak of the tensile strength at the polyvinylidene fluoride fibre of $\eta_{inh}$ about 0.90–0.95, the melt viscosity of which was of medium value of about 5,000 poise.

A fibre or film of linear high polymer comprising vinylidene fluoride has been known by U.S.A. Pat. 2,435,537, which revealed the tensile strength of a polyvinylidene fluoride film to be 3.7 kg./mm.$^2$, and was recently reported by Pennsalt Chemicals Corporation Bulletin UF2R-62 to be 3.5–4.0 g./d. strength of a polyvinylidene fluoride filament, the production process of which was a casting method using polyvinylidene fluoride dispersions, which is more expensive than the melt extrusion process.

We have found that the polyvinylidene fluoride resinous materials polymerized at 0° C. to 40° C., $\eta_{inh}$ of which was below 1.20, particularly 0.95, were easily melt extruded at nearly 250° C. through a fine spinneret, wound up at a very high speed, and stretched thereafter immediately or soon by a draw ratio of at least 150%, particularly 300%, before heat-setting.

In melt spinning, the wind-up linear velocity or draft ratio Z, which is herein defined as the ratio of wind-up linear velocity to exit linear velocity at orifice, is very important when producing continuously uniform low-denier and high-tenacity filament. It may be said that excellent filament of polyvinylidene fluoride has been made from a melt extrusion the draft ratio Z of which is more than about ten. In the melt-spinning of polyvinylidene fluoride resinous materials, the value of $\eta_{inh}$ of which was larger than 1.20, the extruded filaments could not be wound up subsequently even at a moderate draft ratio of more than about ten times. Furthermore, these filaments were hardly oriented along the stretched direction. Consequently, the tensile strength of these filaments, the $\eta_{inh}$ of which was higher than 1.20, was not improved well enough. The melt spinning of commercial polyvinylidene fluorides, the $\eta_{inh}$ of which was about 1.4 to 1.9, was also difficult.

In order to indicate the specific flow properties and fibre forming properties of the various polyvinylidene fluorides resinous materials, the apparent melt viscosities of the various polyvinylidene fluorides are shown in Table IV, and the draft ratios in the melt spinning are shown in Table V corresponding to Table IV.

In Table IV and Table V, the apparent melt viscosities and the draft ratios, respectively, in the cases of two different extruding temperatures of 250 and 280° C. and different extruding pressures of 100, 200 and 300 kg./cm.² are shown, in the case of experiments on known commercial polyvinylidene fluorides, the draft ratios being less than 10, despite the apparent melt viscosity of less than ten thousand poises at 300 kg./cm.². Therefore, the excellent fibre forming properties may correspond to lower melt viscosity accompanying higher draft ratio at lower extruding pressure and lower extruding temperature above the melting point. From these results, it is apparent that the melt extrusions obtained from the Examples 1, 2 and 3 of this invention had the most preferential fibre forming properties which produced excellent high-tenacity filaments.

Of course, melt extrusions, which had very low melt viscosity accompanying the large draft ratio, have been obtained from polyvinylidene fluoride of $\eta_{inh}$ below 0.40, but the finished filaments made from these extrusions were weak and unpractical.

Another feature of the present invention relates to cold or thermal stretching, from which superhigh-tenacity polyvinylidene fluoride fibre is resulted.

As a result of X-ray diffraction investigations of the polyvinylidene fluoride mouldings through an orifice or the unstretched fibre obtained by the melt extrusion, an unoriented α-type X-ray diagram together with a faint β-type X-ray diagram were obtained. It may be defined in this invention that the α-type diagram shows a quadruplet diffraction ($I_1$) at 3.24 A. and a β-type diffraction shows a quadruplet diffraction ($I_2$) at 2.16 A. When an unoriented fibre or film is stretched to some extent of draw ratio and heatset, the X-ray diagram shows an oriented fibre diagram which is a mixture of α and β type diagrams.

TABLE V.—DRAFT RATIOS AND FIBRE FORMING PROPERTIES OF VARIOUS POLYVINYLIDENE FLUORIDES

| | Draft ratio | | | |
|---|---|---|---|---|
| | 250° C. | | 280° C. | |
| Kind of polyvinylidene fluoride | 100 kg./cm.² | 300 kg./cm.² | 100 kg./cm.² | 300 kg./cm.² |
| This invention: | | | | |
| A | 150-200 | 150-200 | >200 | >200 |
| B | 100-150 | 100-150 | >200 | >200 |
| C | 20-30 | 20-30 | 40-80 | 40-80 |
| D | <2 | ¹<2 | ¹<10 | ¹<10 |
| Known commercial: | | | | |
| I | <2 | ¹<2 | <10 | ¹<10 |
| II | ¹<2 | ¹<2 | ¹<10 | ¹<10 |
| III | ¹<2 | ¹<2 | ¹<10 | ¹<10 |

¹ Rough surface.

The unoriented polyvinylidene fluoride fibre could be stretched to about 4 times the draw ratio at room temperature or above, but it has been desirable to stretch at a temperature above room temperature up to 175° C., particularly 130° C.

Unexpectedly, in the X-ray diffraction diagrams the intensity of $I_1$, the quadruplet diffraction of α-type is weaker, and the intensity of $I_2$, the quadruplet diffraction of β type, is stronger in the case of higher draw ratio of the stretching. $I_1$ vanishes, and there is strong $I_2$ only when the orientation effect on the stretching has become very large. The intensity ratio $I_1/I_2$, is closely related to the draw temperature and the drawing technique, as well as the draw ratio of the stretching. For instance, $I_1/I_2$ is less (degree of change from α to β has been great) when the draw temperature is low, $I_1/I_2$ is zero when the first stretching is carried out at 80-130° C., and subsequently the second stretching is carried out at 80-175° C., while $I_1/I_2$ is not zero even if the draw ratio is the maximum, when only one stretching was carried out at a temperature higher than 130° C.

We have found that the intensity ratio $I_1/I_2$ is closely related to the tensile strength of the polyvinylidene fluoride fibre.

Figure 2:
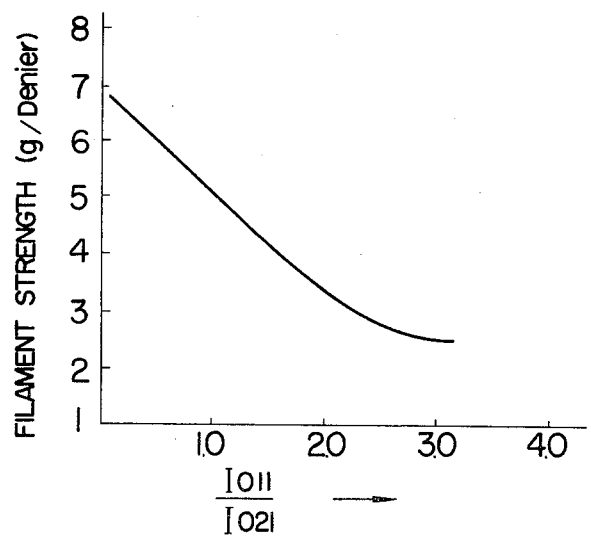
FIG. 2 is a graphical representation indicating the relationship between the intensity ratio $I_1/I_2$ in the X-ray diffraction diagrams of various fibres obtained by various conditions of stretching and the tensile strength of these fibres, said fibres having been obtained by subjecting a polyvinylidene fluoride resin having inherent viscosity η inh of 0.92 to melt-spinning.

FIG. 2 shows the relationship between the intensity ratio $I_1/I_2$ in the X-ray diffraction diagrams of various fibres obtained by various conditions of stretching and the tensile strength of these filaments.

Each of the samples used in the photographing of said X-ray diffraction photographs was formed to be a fibre bundle having a dimension of 0.5 mm. x 5 mm. and photographing was carried out by use of an electric power of 40kv. x 20 ma., a Ni filter, and a slit of 1 mm. The distance between the sample and camera was 40 mm. In the measuring of $I_1/I_2$, a sample having a dimension of 0.5 x 5 x 20 mm. which was formed by use of a bundle of fibres of 0.06 g. and collodion solution, was subjected to a measuring by use of a Geiger counter, a Ni filter, a slit of 1 mm., and an electric power of 40 kv. x 20 ma. In this invention, thermal stretching operation can be carried out at a temperature between room temperature and 175° C., but it is preferable to carry out the stretching at a temperature between 80° C. and 130° C. and then

TABLE IV.—APPARENT MELT-VISCOSITIES ¹ OF VARIOUS POLYVINYLIDENE FLUORIDES

| | Apparent melt viscosity (×10³ poise) | | | | | |
|---|---|---|---|---|---|---|
| | 250° C. | | | 280 °C. | | |
| Kind of polyvinylidene fluoride | 100 kg./cm.² | 200 kg./cm.² | 300 kg./cm.² | 100 kg./cm.² | 200 kg./cm.² | 300 kg./cm.² |
| This invention: | | | | | | |
| A ($\eta_{inh}$=0.82) | 3.3 | 1.1 | 0.8 | 2.8 | 1.3 | 0.88 |
| B ($\eta_{inh}$=0.94) | 9.0 | 4.8 | 2.6 | 4.2 | 1.7 | 0.80 |
| C ($\eta_{inh}$=1.06) | 16 | 7.0 | 3.7 | 11 | 4.4 | 2.7 |
| D ($\eta_{inh}$=1.33) | 83 | 38 | 23 | 53 | 18 | 11 |
| Known commercial: | | | | | | |
| I | 65 | 20 | 9 | 35 | 11 | 6.0 |
| II | 150 | 32 | 14 | 68 | 17 | 8.2 |
| III | 200 | 39 | 16 | 100 | 24 | 11 |

¹ Measured by using a Shimadzu type (Koka-type) Flow Tester with an orifice of 0.5 mm. diameter and 10 mm. length.

to carry out secondary stretching and or heat setting at a temperature between 130° C. and 175° C. In this case, it is preferable to carry out the primary stretching at a stretching rate above 150% and further improvement of $I_1/I_2$ and strength of the product can be attained by carrying out the secondary stretching at a stretching ratio of above 5%. The properties of the filaments which were subjected to stretching operation as described above are shown in Table VI.

The Table VI relates to test of filaments obtained by subjecting polyvinylidene fluoride resins to spinning operation through a nozzle of 0.5 mm. $\phi$, said resins having been produced by the substantially same process as the polymerization Examples 1, 2 and 3 and having $\eta_{inh}$ of 0.84, 0.92 and 1.06 respectively, and by winding up said filaments at a draft ratio such as indicated in said table. These filaments were subjected, after primary stretching thereof at 120° C., to heat setting for one hour at a temperature of 120° C. and stretching ratio of 2%. Then, these stretched filaments were, after secondary stretching of 20% at 150° C., subjected to heat setting for one hour at 170° C. $I_1/I_2$, strength and stretching ratio of said filaments were compared in the Table VI with those of the filaments made of the conventional polyvinylidene fluoride.

more than 5.0 g./d. and are excellent compared with the known commercial polyvinylidene filament.

Example 5

The oriented monofilaments shown in Table VII were again stretched at 170° C. with a draw ratio of 20% and annealed for one hour under these conditions. Their intensity ratios and tensile properties are shown in Table VIII.

TABLE VII.—$I_1/I_2$ AND TENSILE PROPERTIES OF VARIOUS ORIENTED POLYVINYLIDENE FLUORIDES MONOFILAMENTS OF THIS INVENTION

| $\eta_{inh}$ of polyvinylidene fluorides of this invention | Draft ratio | Draw ratio of stretching (times) | Denier of oriented filament | Intensity ratio, $I_1/I_2$ | Tensile strength (g./d.) | Tensile elongation (percent) |
|---|---|---|---|---|---|---|
| 0.84 (I) | 180 | 4.0 | 10 | 1/1.5 | 5.5 | 25 |
| 0.92 (II) | 120 | 4.0 | 15 | 1/2 | 6.0 | 22 |
| 1.06 (III) | 25 | 4.0 | 35 | 1/1 | 5.5 | 25 |

TABLE VIII.—$I_1/I_2$ AND TENSILE PROPERTIES OF SECONDARY STRETCHED POLYVINYLIDENE FLUORIDES MONOFILAMENTS OF THIS INVENTION

| $\eta_{inh}$ | Intensity ratio $I_1/I_2$ | Tensile strength (g./d.) | Tensile elongation (percent) |
|---|---|---|---|
| 0.84 | 1/10 | 6.4 | 20 |
| 0.92 | 0/ | 7.0 | 20 |
| 1.06 | 0/ | 6.5 | 20 |

Example 6

A polyvinylidene fluoride film was made by the melt-extrusion of $\eta_{inh}=0.92$ through a slot orifice, and was wound up at 20 m/min. This was stretched with a draw ratio of 250% at 135° C. while passing between two nip rolls. The thickness of this oriented film was 0.02 m./n. The tensile strength and the elongation of this ori-

TABLE VI.—PROPERTIES OF STRETCHED FILAMENTS MADE OF POLYVINYLIDENE FLORIDE

| Inherent viscosity | Draft ratio | Primary stretching Temperature, ° C. | Stretching ratio, percent | Heat setting temperature, ° C. | Secondary stretching Temperature | Stretching ratio | Heat setting temperature | $I_1/I_2$ | Strength, g./denier | Extension percent |
|---|---|---|---|---|---|---|---|---|---|---|
| Polyvinylidene Fluoride of this invention | | | | | | | | | | |
| 0.84 | | 120 | 300 | 150 | | | | 1/1.5 | 5.5 | 25 |
| 0.84 | | 120 | 300 | 150 | 150 | 20 | 170 | 1/10 | 6.4 | |
| 0.92 | 120 | | | | | | | 3/1 | 1.0 | |
| 0.92 | 120 | 120 | 300 | 150 | | | | 1/2 | 6.0 | 22 |
| 0.92 | 120 | 120 | 400 | 150 | | | | 1/4.5 | 6.5 | 20 |
| 0.92 | 120 | 120 | 400 | 150 | 150 | 20 | 170 | 0/1 | 7.0 | 20 |
| 1.06 | 25 | 120 | 300 | 150 | | | | 1/1 | 5.5 | 25 |
| 1.06 | 25 | 120 | 300 | 150 | 150 | 20 | 170 | 0/1 | 6.5 | 20 |
| Known commercial | | | | | | | | | | |
| 1.4 | (¹) | 140 | 300 | | | | | 2/1 | 2.5 | 25 |
| 1.6 | (¹) | 210 | (²) | | | | | 4/1 | | |
| 1.6 | | 140 | 300 | | | | | 2/1 | 2.5 | 25 |

¹ Draft is impossible.
² Impossible.

In the case of film, similarly, it is possible to change $\alpha$ type crystalline structure to $\beta$ type crystalline structure by carrying out the operation of stretching and heat treatment, and also possible to obtain a strong film by maintaining $I_1/I_2$ at a figure less than 1.3.

Example 4

Three unstretched polyvinylidene fluoride mono-filaments were made from the resinous materials by the suspension polymerization shown in Table I. These unstretched monofilaments, which were extruded at 250° C. through an orifice of 0.5 mm. $\phi$ by a plunger-type melt extruding apparatus and were wound up at the respective draft ratios, were stretched at 120° C. with a draw ratio of 3 times. These stretched monofilaments were thus subsequently heat-set for one hour at 150° C. with a 2% elongation so that the orientation might set well.

The intensity ratio $I_1/I_2$ measured by the X-ray diffraction diagram and the tensile strength and elongation of the oriented polyvinylidene fluorides monofilaments of this invention made by the procedure described above, are shown in Table VII, in which the tensile strengths are all ented film were 35 kg./mm.² and 35%, respectively, and the intensity ratio $I_1/I_2$ was 1/1.

What we claim is:

1. A process for producing fibers or films of polyvinylidene fluoride which comprises: suspension-polymerizing vinylidene fluoride at a temperature of between 0° C. and 30° C. in a water medium in the presence of a catalyst selected from the group consisting of (1) a dialkylperoxydicarbonate represented by the following general formula

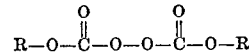

wherein R is a primary alkyl group having 1 to 4 carbon atoms, or a secondary alkyl group having 3 to 6 carbon atoms, and (2) a dialkylperoxycarbonate represented by the following general formula

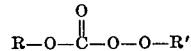

wherein R is a primary alkyl group having 1 to 3 carbon atoms or a secondary alkyl group having 4 to 6 carbon atoms and R' is a primary alkyl group having 1 to 3 carbon atoms or a secondary alkyl group having 3 to 5 carbon atoms and in the presence of a chain transfer agent selected from the group consisting of chloroform, n-hexane, and cyclohexane to control the degree of polymerization, thereby obtaining a polyvinylidene fluoride resin having a melting point of between 185° C. and 190° C., a crystallization temperature of from 135° C. to 146° C. and an inherent viscosity of from 0.4 to 1.20; and forming said polymer into articles of desired shape by melt-extrusion.

2. The process as defined in claim 1, in which said formed article is stretched out at a stretching temperature of from room temperature to 175° C. at a stretching ratio of more than 150% to impart crystal orientation thereto, and then heat-set at a temperature of from 120° C. to 175° C.

References Cited

UNITED STATES PATENTS

| | | | |
|---|---|---|---|
| 3,022,281 | 2/1962 | Smith | 260—92.1 X |
| 3,413,277 | 11/1968 | Crano et al. | 260—92.1 X |
| 3,451,985 | 6/1969 | Maulo | 260—92.1 X |
| 3,376,370 | 4/1968 | Koblitz et al. | 260—92.1 X |
| 2,647,107 | 7/1953 | Barnes | 260—78.5 CL |
| 2,831,843 | 4/1958 | Seymour | 260—92.8 W |
| 3,475,396 | 10/1969 | McCain et al. | 260—92.1 |
| 3,522,341 | 7/1970 | Coplan et al. | 264—210 F |
| 3,553,185 | 1/1971 | Amagi | 260—92.1 |

FOREIGN PATENTS

| | | | |
|---|---|---|---|
| 1,419,741 | 10/1965 | Japan | 260—92.1 |

PHILIP E. ANDERSON, Primary Examiner

U.S. Cl. X.R.

161—189; 260—92.1; 264—210 F, 235, 342 RE, DIG 73

UNITED STATES PATENT OFFICE
CERTIFICATE OF CORRECTION

Patent No. 3,707,592     Dated December 26, 1972

Inventor(s) Hajime ISHII, Nobuo BANNAI and Sadao NISHITA

It is certified that error appears in the above-identified patent and that said Letters Patent are hereby corrected as shown below:

Column 1, between lines 6 and 7 after the title, the following priority information should be inserted:

-- Priority claimed for:
   Japanese application no. 59812/1964, filed October 21, 1964 and Japanese application no. 57016/1965, filed September 18, 1965. --.

Signed and sealed this 15th day of May 1973.

(SEAL)
Attest:

EDWARD M. FLETCHER, JR.
Attesting Officer

ROBERT GOTTSCHALK
Commissioner of Patents